United States Patent
Gudermuth et al.

[11] Patent Number: 6,018,902
[45] Date of Patent: Feb. 1, 2000

[54] IRIDESCENT COATING FOR FISHING LURE

[75] Inventors: Clyde S. Gudermuth; Daniel T. Stoner; Charles E. Williams, all of Fort Smith, Ark.; Kevin P. Murray, Schaumburg, Ill.

[73] Assignee: EBSCO Industries, Inc., Birmingham, Ala.

[21] Appl. No.: 08/884,603

[22] Filed: Jun. 27, 1997

[51] Int. Cl.[7] ................................................ A01K 91/00
[52] U.S. Cl. ........................ 43/42.32; 43/42; 43/42.33; 43/42.53; 43/34; 428/689; 428/698; 428/699; 428/213
[58] Field of Search .................... 428/688, 689, 428/698, 699, 212, 213; 43/42, 42.32, 42.33, 34, 42.53

[56] References Cited

U.S. PATENT DOCUMENTS

| | | | |
|---|---|---|---|
| D. 270,749 | 9/1983 | Gowing et al. | 43/42.13 |
| 3,895,155 | 7/1975 | Shukuri et al. | 428/206 |
| 4,199,888 | 4/1980 | Barnes | 43/42.33 |
| 4,249,763 | 2/1981 | Provencher et al. | 294/19 R |
| 4,429,482 | 2/1984 | Honse | 43/42.32 |
| 4,464,857 | 8/1984 | Olszewski | 43/42.33 |
| 4,518,746 | 5/1985 | Sekmakas et al. | 525/443 |
| 4,861,656 | 8/1989 | Uchiyama et al. | 428/333 |
| 4,862,631 | 9/1989 | Wilson et al. | 43/42.33 |
| 4,873,782 | 10/1989 | Gudermuth, Jr. | 43/42.15 |
| 5,129,176 | 7/1992 | Gudermuth, Jr. | 43/42.52 |
| 5,131,182 | 7/1992 | Ising | 43/42.53 |
| 5,215,798 | 6/1993 | Hirata et al. | 428/64 |
| 5,215,799 | 6/1993 | Sakoda et al. | 428/64 |
| 5,219,625 | 6/1993 | Matsunami et al. | 428/30 |
| 5,248,545 | 9/1993 | Proscia | 428/212 |
| 5,253,446 | 10/1993 | Ogle | 43/42.13 |
| 5,362,552 | 11/1994 | Austin | 428/216 |
| 5,465,524 | 11/1995 | Vallone et al. | 43/42.32 |
| 5,494,743 | 2/1996 | Woodard et al. | 428/336 |
| 5,520,996 | 5/1996 | Balian et al. | 428/216 |
| 5,700,550 | 12/1997 | Uyama et al. | 428/212 |
| 5,780,149 | 7/1998 | McCurdy et al. | 428/336 |

*Primary Examiner*—William Krynski
*Assistant Examiner*—Betelhem Shewareged
*Attorney, Agent, or Firm*—Kenneth M. Bush; Veal & Bush, LLC

[57] ABSTRACT

A multi-layered iridescent reflective coating for a fishing lure and the method for applying the coating to the surface of the lure. The coating preferably comprises a base layer, an optical stack comprising at least 3 layers of refractive material, and a protective layer. The layers of refractive material are vacuum deposited on a lure pre-coated with an ultraviolet cured polymer base layer. The optical stack can be applied to painted lures, pre-colored lures, or undecorated lures. The substrate, or lure surface, does not affect the process but can yield varying iridescent effects, depending on the texture and color of the substrate surface. The relative thickness of each optical layer and its relation to the other layers in the optical stack combine to achieve a variety of iridescent effects. A protective layer having a low refractive index is applied over the finished optical stack.

24 Claims, 2 Drawing Sheets

IRIDESCENT COATING FOR FISHING LURE

FIELD OF THE INVENTION

The present invention relates to coatings for fishing lures. More particularly, the present invention relates to an iridescent reflective coating for a fishing lure and the application thereof.

BACKGROUND OF THE INVENTION

Fishing is one of the world's favorite pastimes and as a result, one of the world's most lucrative industries. Artificial fishing lures are constantly being developed to improve their fish-attracting features as well as their consumer-attracting features. Depending on the depth and the species of fish, different light wavelengths attract different types of fish. The present invention is directed towards an artificial fishing lure having an iridescent finish for attracting numerous species of fish via a multi-colored spectrum of reflected light.

SUMMARY OF THE PRESENT INVENTION

It is the object of the present invention to provide a fishing lure having an iridescent reflective coating which attracts fish.

It is another object of the present invention to provide a method for coating a fishing lure with an iridescent reflective coating.

It is another object of the present invention to utilize a coating comprising a plurality of interference optical layers which render a highly reflective surface.

It is a further object of the present invention to utilize a coating wherein the optical layers form an optical stack of dielectric films having an iridescent appearance.

These and other objects of the present invention are accomplished through a multi-layered iridescent reflective coating for a fishing lure and the method for applying the coating to the surface of the lure. The coating preferably comprises a base layer, an optical stack comprising at least 3 layers of refractive material, and a protective layer. The layers of refractive material are vacuum deposited on a lure pre-coated with an ultraviolet cured polymer base layer. The optical stack can be applied to painted lures, pre-colored lures, or undecorated lures. The substrate, or lure surface, does not affect the process but can yield varying iridescent effects, depending on the texture and color of the substrate surface. The relative thickness of each optical layer and its relation to the other layers in the optical stack combine to achieve a variety of iridescent effects. A protective layer having a low refractive index is applied over the finished optical stack.

These and other objects and advantages of the invention will become apparent from the following detailed description of the preferred embodiment of the invention.

BRIEF DESCRIPTION OF THE DRAWING

Apparatus and method embodying features of the present invention are depicted in the accompanying drawings which form a portion of this disclosure and wherein.

DETAILED DESCRIPTION OF THE PREFERRED EMBODIMENT

Figure 1:
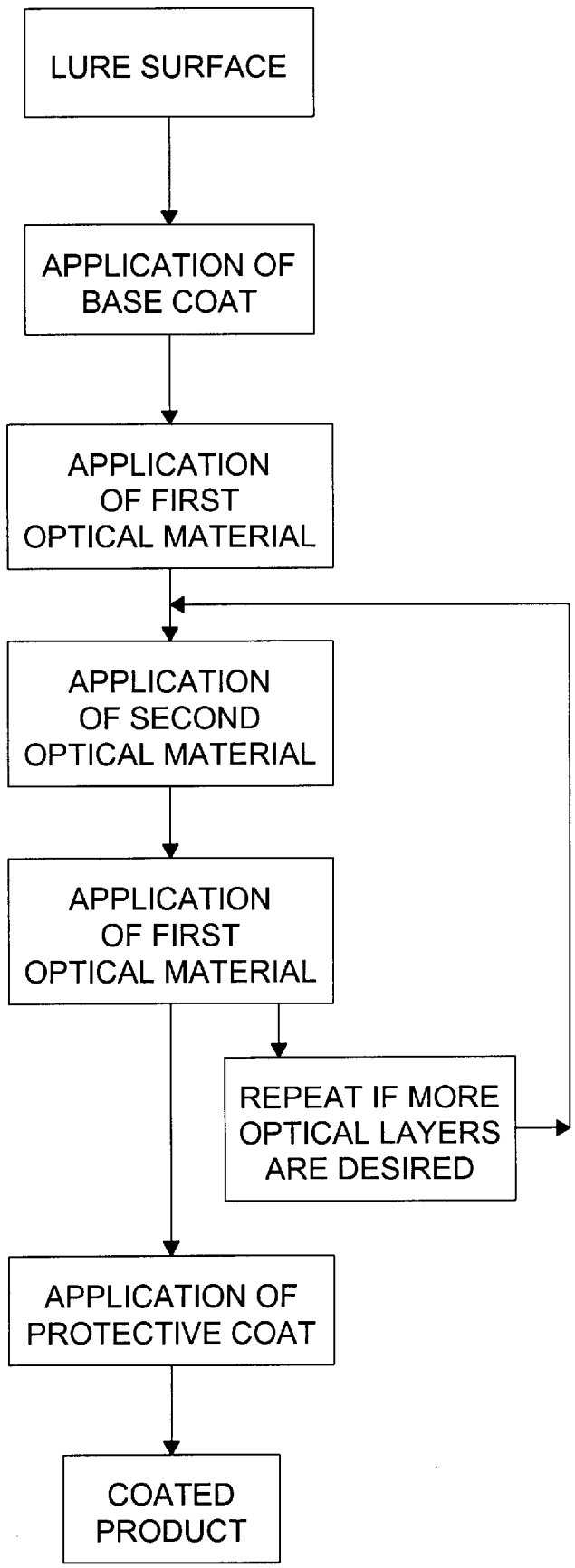
FIG. 1 is a schematic drawing illustrating the process for applying the optical coating to a fishing lure.

The present invention relates to thin film optical coatings as applied to the surface of fishing lures, preferably though physical vapor deposition (PVD). An excellent resource on techniques used for applying thin films, including PVD, is *Thin Film Processes II*, edited by John L. Vossen and Werner Kem (Academic Press, Inc., 1991). The preferred embodiment of the present invention comprises a fishing lure having an optical coating thereon, illustrated in FIG. 2, wherein the optical coating comprises a base layer 12 applied to the surface of the fishing lure 11, or substrate, an optical stack comprising a plurality of dielectric film layers 13, 14, and 15, and a top layer 16 for protection. The first layer of dielectric film 13 and the third layer of dielectric film 15 comprise the same refractive material, which differs from the refractive material comprising the second layer of dielectric film 14. The resulting thin film stack provides a highly reflective iridescent appearance, whereas observed artifacts of a poorly designed multi-layer structure include loss of iridescent effect, puckering, cracking, clouding, loss of adhesion, and outgassing.

The optical coating can be applied to fishing lures having surfaces comprising thermoplastic polymers, wood, or metal. Polymers such as acrylonitrile butadiene styrene (ABS), polycarbonate, acrylic, polystyrene, or nylon, having a thermal deflection temperature of about 180° F., as measured pursuant to the American Society for Testing and Materials (ASTM) Method D648 Condition A, are preferred substrates. The coating can be applied to painted lures, pre-colored lures, or undecorated lures. The substrate does not affect the process, but can yield varying iridescent effects depending on the texture and color of the substrate surface.

The base layer 12 conditions the substrate surface to receive the optical coating and acts to adhere the first dielectric film layer to the substrate. The base layer should render the substrate surface smooth enough for high specular reflectance, be sufficiently immobile to prevent overlying layers from shifting, and have barrier properties to prevent solvent transport. The base layer should possess sufficient thermal stability to resist interfacial loading stresses brought on by mismatches in thermal coefficients of expansion between the organic and inorganic layers, as well as within the individuals layers themselves. Suitable base layer materials include, but are not limited to, spray, dip, flow or other liquid based polymers and organic based chemical vapor deposition (CVD) materials. Thermally cured organic coatings, similar to some used in the vacuum deposition of metals, and silane coupling agents can be used as base layers, although they appear to be less desirable alternatives. The base layer 12 of the preferred embodiment utilizes free-radical based ultraviolet (UV) curing technologies with urethane acrylate, low viscosity hydrophilic, low shrink stress coatings possessing a high glass transition temperature, greater than 60° C. This embodiment forms cross-linked, dimensionally stable films. Base layer thickness in the range of 0.5 to 30 mils is possible with a preferred range of 1 to 3 mils, a mil being equal to one thousandth of an inch (0.0254 millimeter).

The optical stack comprises an odd number of layers with a minimum of 3 layers comprising 2 alternating materials. For example, if the first layer is denoted by A, and the second layer is denoted by B, then the optical stack (OS) can be defined as OS=A+n(B+A), wherein n=any whole number$\geq 1$. The combination of films is preferably selected to yield relatively large differences in refractive index and low sublimation temperatures. The first optical layer 13 of the optical stack is preferably zinc sulfide (ZnS), having a refractive index of about 2.15 to 2.5 and an evaporation temperature of about 800° C. High purity (99.99%) is preferred to reduce rapid outgassing ("spitting") of the material, which can result in solid pieces of material being ejected onto the working surface (base layer) causing surface defects. Indium oxide ($In_2O_3$), having an evaporation temperature of about 600° C., a refractive index of about 2.5, and a preferred purity of 99.999%, can be substituted for ZnS.

The second or intermediate optical layer 14 is preferably magnesium fluoride ($MgF_2$), having a refractive index of about 1.36 to 1.42, an evaporation temperature of about 950° C., and a preferred purity of 99.999%. Alternate intermediate layer materials include silicon dioxide ($SiO_2$), having a refractive index of about 1.44 to 1.52 and evaporation temperature of about 1600° C., and sodium aluminum fluoride (cryolite) ($NaAlF_6$), having a refractive index of about 1.35 and evaporation temperature of about 900° C. Although $NaAlF_6$ can be deposited, it is water reactive and realistically unsuitable for fishing lure applications. The third optical layer 15 is the same as the first optical layer 13, which in the preferred embodiment is ZnS. Although multiple thin film layers can be applied, satisfactory appearance was obtained with three layers.

The top layer 16 is a protective layer preferably of urethane acrylate having a low refractive index and is applied in a very thin film, between about 0.75 to 1 mil, to avoid further light refraction or any alteration of the iridescent effect. The top layer should have low shrinkage during polymerization (<7% volume change), and balanced thermal properties which provide adhesion to the outermost dielectric layer and maintain adhesion in the underlying layers. The UV cured top layer should also provide sufficient mechanical strength for protection during further production steps and final in-service conditions, as well as high hydrophobicity, which is a necessity for its intended use in a water environment. Finally the top layer preferably cures at a sufficiently high rate to maintain production efficiency.

Figure 2:
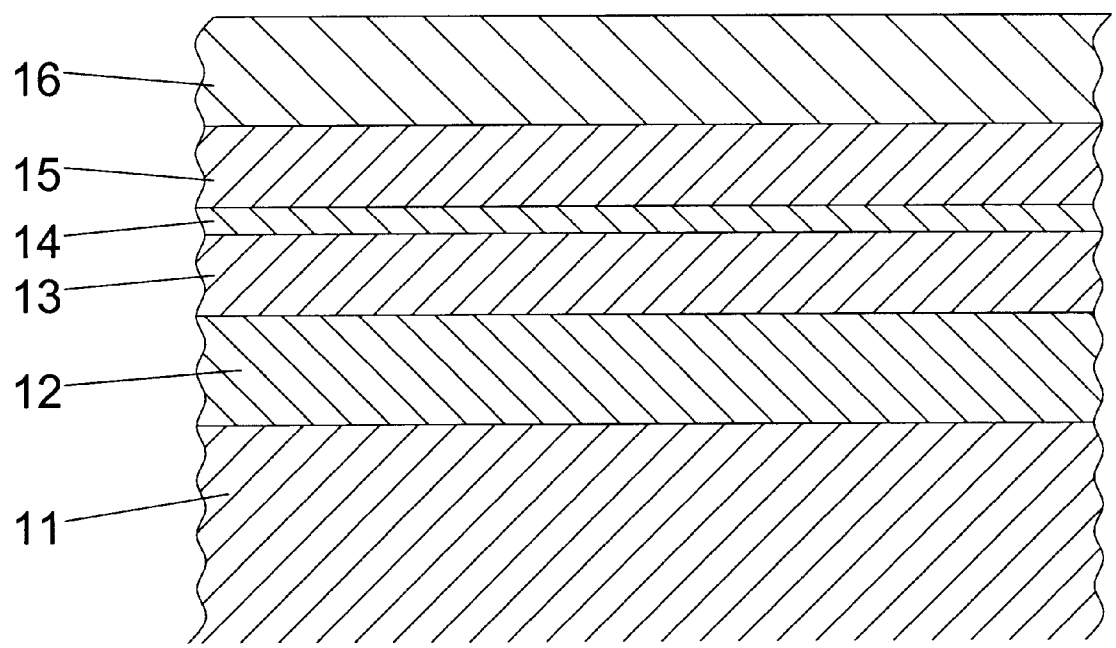
FIG. 2 is a cross-section of the coated fishing lure illustrating the layers comprising the optical coating.

The application of the optical coating, illustrated in FIGS. 1 and 2, begins with applying a suitable base layer 12 to the lure substrate 11 and curing the base layer. The dielectric films are subsequently applied by physical vapor deposition (PVD) under vacuum conditions. The vacuum apparatus used comprises a vacuum chamber equipped with a high vacuum pump, commonly used in vacuum metalizing processes, one or more crystal detectors for monitoring film thickness, a rate monitor and controller, and a programmable controller for the electromechanical operation of the apparatus. Also, suitable workpiece holders are required, for example, holders similar to those utilized in vacuum plating. The optical materials are sublimated in the vacuum chamber under high vacuum, between $10^{-4}$ to $10^{-6}$ torr and preferably between $1.2 \times 10^{-4}$ to $2.0 \times 10^{-4}$ torr. All the layers of the optical materials are deposited in sequence and during the same vacuum pump down period. Exposure of any intermediate layers to the atmosphere promotes oxidation of the layer and interferes with interlayer adhesion.

Dielectric films can be applied via resistance-heated sources, electron beam evaporation sources, arc evaporation sources, sputter deposition processes, or using Sol-Gel coatings; however, the preferred embodiment utilizes resistance heated sources, either common metallic boats or tungsten wire baskets. For deposition on fishing lures, tungsten wire baskets were determined to provide the most uniform application because the open holder feature allows a greater vapor radiation arc, about 270° swept internal angle of the vacuum chamber, compared to a narrowly focused plume from metallic boats. This greater vapor radiation arc allows more rapid deposition of the optical materials at lower temperatures, which is important for reducing thermal stress of the substrate and deposited film.

A dual bus system having two sources of tungsten wire baskets is used such that two different nonmetal optical materials can be evaporated sequentially, with the sources having separate amperage and temperature settings appropriate for each material. The sources are constructed and arranged equivalent to those commonly used in vacuum metalizing. The optical materials deposited in the thin film stack preferably have a relatively low evaporation temperature and differ in refractive index as much as possible.

All layers are applied in sequence under near constant vacuum conditions, although the pressure level may differ by design in each layer, and may slightly fluctuate due to hysteresis lag between the monitor and the deposition controlling unit. Power is applied to the first bus bar (A) when a suitable vacuum level is attained. Bus A, holding the basket containing the first layer material, is heated by increasing amperage, controlled by a programmable controller, to a level below the sublimation temperature of the first layer material. After a predetermined soak time in which the material in the basket reaches a uniform temperature, typically 10–30 seconds, higher current (315 amps for ZnS) is applied bringing the material to evaporation temperature.

The deposition of the film is measured by a crystal film thickness instrument This instrument and its controller measure the relative film thickness and deposition rate. For ZnS, the deposition rate is typically between 4 to 12 Angstroms per second (Å/sec) with best results observed at 6 Å/sec. For optimal iridescent effect, the thickness of the first ZnS layer under the intermediate MgF layer should be 3 times the thickness of the MgF layer, and the second ZnS layer (or third layer) over the MgF layer should be 2 to 3 times the thickness of the MgF layer. When a predetermined film thickness limit is sensed, preferably about 0.15 kÅ for the first layer, current is reduced to zero for bus A. Power is then switched to the other bus bar (B) by the machine controller and a similar sequence is followed. The film thickness limit for the second layer is preferably about 0.5 kÅ. These readings can vary with instrument placement within the chamber.

Upon completion of the final optical layer, the vacuum chamber is returned to atmospheric pressure and the workpieces are removed. The workpieces are preferably coated with the protective layer 16 within 2 hours after removal from the vacuum. The protective layer is similar to that used in the base layer, preferably an organic UV cured coating, having as its primary purpose protection of the thin film stack. It is preferably very thin to avoid further light refraction and alteration of the iridescent effect. The outer layer is formulated to adhere to the outermost dielectric film layer and to penetrate the stack to yield better composite strength.

The optical coating imparts an iridescent appearance to the fishing lure yet possesses sufficient mechanical and physical strength to maintain the integrity of the finish under normal fishing conditions. The development of this optical stack and its application to fishing lures is significant for the physical strength and durability achieved. The present invention provides superior adhesion qualities to the optical stack and has superior resistance to abrasion and cutting.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. A fishing lure having an outer coating comprising:
   a) a first layer over the surface of said lure, wherein said first layer comprises a conditioning material;
   b) a second layer over said first layer, wherein said second layer comprises a first refractive material;
   c) a third layer over said second layer, wherein said third layer comprises a second refractive material having an index of refraction which is different from an index of refraction of said first material;
   d) a fourth layer over said third layer, wherein said fourth layer comprises said first refractive material; and
   e) a fifth layer over said fourth layer, wherein said fifth layer comprises a protective material.

2. A fishing lure according to claim 1, wherein said first refractive material is selected from the group consisting of zinc sulfide and indium oxide.

3. A fishing lure according to claim 2, wherein said first refractive material is zinc sulfide having a refractive index of about 2.15 to 2.5 and an evaporation temperature of about 800° C.

4. A fishing lure according to claim 2, wherein said first refractive material is indium oxide having a refractive index of about 2.5 and an evaporation temperature of about 600° C.

5. A fishing lure according to claim 1, wherein said second refractive material is selected from the group consisting of magnesium fluoride and silicon dioxide.

6. A fishing lure according to claim 5, wherein said second refractive material is magnesium fluoride having a refractive index of about 1.36 to 1.42 and an evaporation temperature of about 950° C.

7. A fishing lure according to claim 5, wherein said second refractive material is silicon dioxide having a refractive index of about 1.44 to 1.52 and an evaporation temperature of about 1600° C.

8. A fishing lure according to claim 1, wherein said second layer is about 3 times the thickness of said third layer.

9. A fishing lure according to claim 8, wherein said fourth layer is about 2–3 times the thickness of said third layer.

10. A fishing lure according to claim 1, wherein said conditioning material comprises urethane acrylate.

11. A fishing lure according to claim 1, wherein said protective material comprises urethane acrylate.

12. A fishing lure according to claim 1, wherein said layers of refractive material form an optical stack having an iridescent appearance.

13. A fishing lure having an iridescent coating, wherein said coating comprises:
   a) a first layer over the surface of said lure wherein said first layer comprising a first refractive material;
   b) a second layer over said first layer, wherein said second layer comprises a second refractive material having an index of refraction which is different from an index of refraction of said first material; and
   c) a third layer over said second layer, wherein said third layer comprises said first refractive material.

14. A fishing lure according to claim 13, wherein said first refractive material is selected from the group consisting of zinc sulfide and indium oxide.

15. A fishing lure according to claim 14, wherein said first refractive material is zinc sulfide having a refractive index of about 2.15 to 2.5 and an evaporation temperature of about 800° C.

16. A fishing lure according to claim 14, wherein said first refractive material is indium oxide having a refractive index of about 2.5 and an evaporation temperature of about 600° C.

17. A fishing lure according to claim 13, wherein said second refractive material is selected from the group consisting of magnesium fluoride and silicon dioxide.

18. A fishing lure according to claim 17, wherein said second refractive material is magnesium fluoride having a refractive index of about 1.36 to 1.42 and an evaporation temperature of about 950° C.

19. A fishing lure according to claim 17, wherein said second refractive material is silicon dioxide having a refractive index of about 1.44 to 1.52 and an evaporation temperature of about 1600° C.

20. A fishing lure according to claim 13, wherein said first layer is about 3 times the thickness of said second layer.

21. A fishing lure according to claim 20, wherein said third layer is about 2–3 times the thickness of said second layer.

22. A fishing lure according to claim 13, wherein said coating further comprises a conditioning layer over the surface of said lure, wherein said conditioning layer comprises urethane acrylate.

23. A fishing lure according to claim 13, wherein said coating further comprises a protective layer over said third layer, wherein said protective layer comprises urethane acrylate.

24. A fishing lure according to claim 13, wherein said layers of refractive material form an optical stack having an iridescent appearance.

* * * * *